Nov. 15, 1927.  
L. E. IKE  
1,649,233  
AUTOMOBILE BED  
Filed Sept. 10, 1926
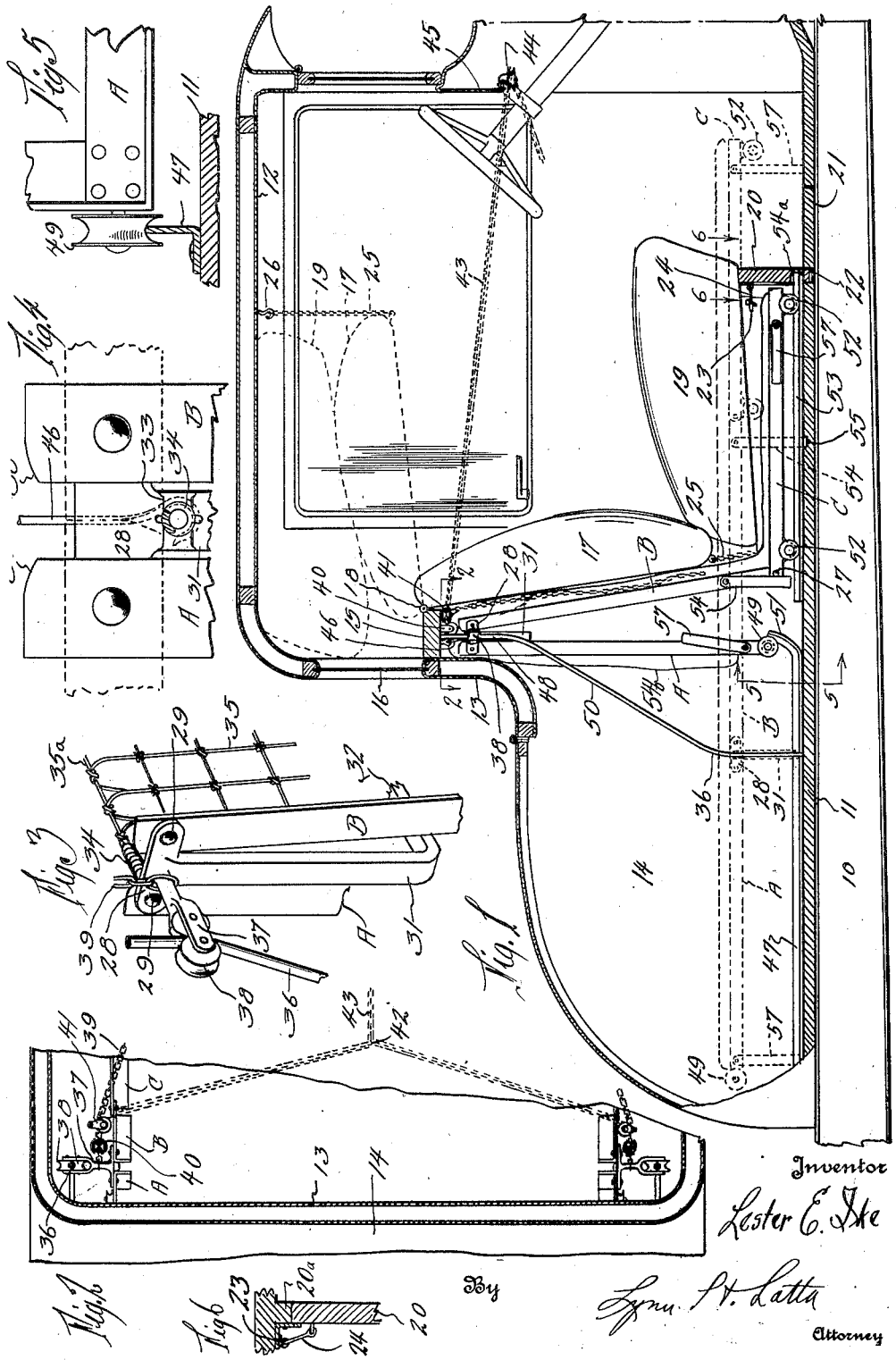
Inventor  
Lester E. Ike  
By  
Lynn H. Latta  
Attorney Patented Nov. 15, 1927.

1,649,233

UNITED STATES PATENT OFFICE.

LESTER E. IKE, OF PLAINVIEW, NEBRASKA.

AUTOMOBILE BED.

Application filed September 10, 1926. Serial No. 134,677.

My invention relates to an automobile bed of the general type disclosed in my co-pending application, Serial No. 129,563, and it is the object of the present invention to provide a bed having features similar to that of my other application but particularly adapted to use in connection with a coupé type or roadster type of automobile, that is, that type of vehicle having a single seat construction and a storage space behind the seat.

It is my object in the present invention to provide a bed adapted to be folded under and behind the seat and thence to spread in either direction to occupy a storage and forward floor space of the vehicle, the seat back being hinged to raise and form a shelf for the reception of a seat cushion as in the bed of my other application.

Another object of my invention is to provide means for automatically guiding the respective hinged portions of the bed from and to its folded position to and from its extended position upon the floor of the vehicle, together with means, including a cable for raising and lowering the bed.

The parts are designed so that by attaching the cable to one portion of the bed, the pulling upon the cable and consequently raising of that portion will automatically bring the entire bed to its folded position occupying the space behind and beneath the seat.

Another object of the present invention is to so arrange the forward seat frame member in hinged relation to the floor that it may be swung to a position entirely flush with the surface of the floor so as to form no obstruction to the rolling movement of the bed along the floor toward its extended position.

My invention further resides in the particular construction of the bed proper, including means for supporting it above the floor and for locking it against collapsing when in its extended position, said supporting and locking means being so arranged as to facilitate the arranging of the bed in extended position and being particularly adapted in the simplest possible manner to maintain the bed in absolute rigidity during its occupancy.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a side elevation of a vehicle embodying my invention, a portion of the side being removed and the walls, thereof, shown in section.

Fig. 2 is a horizontal, sectional view taken on the line 2—2 of Fig. 1, illustrating the raising chain in full lines in its position just preparatory to lowering the bed and in dotted lines in its position after the bed has been lowered.

Fig. 3 is a detail, perspective view of a portion of the bed illustrating its guide rod, connection, the connection of the lifting chain, and showing the supporting yoke.

Fig. 4 is an enlarged, detail view of the inner side of one of the double joints of the bed.

Fig. 5 is a detail view taken as indicated by the line 5—5 of Fig. 1.

Fig. 6 is a detail sectional view taken on line 6—6 of Fig. 1.

In my co-pending application, Serial No. 129,653, I have described a bed designed to be used in connection with that type of automobile having a rear seat and having hinged front seats, the bed being an individual bed adapted to be spread upon the floor of the vehicle and when folded to occupy the L-shaped space behind and beneath the rear seat. Such a bed comprises substantially three sections hinged together and folded, one section behind the back of the seat and two sections beneath the cushion. In that application, it is my intention to cover broadly the folding of a bed into an L-shaped space behind and beneath a seat such as the construction which is described in the present application; in the present application, it is my intention to cover specifically the embodiment of such a device in a one seated vehicle wherein the bed must be spread in two directions instead of one.

I have used the reference character 10 to indicate a side chassis member upon which is supported the floor 11 of the vehicle. The body includes the cab which is indicated generally by the reference numeral 12 and which has the rear wall 13. The storage compartment, which is commonly known as the "turtle back", is indicated generally by the reference character 14. The shelf 15, commonly found in vehicles of this type, is secured between the sides of the vehicle just below the rear window 16 and the back 17 is hinged at 18 to the forward upper corner of the shelf as described in my copending application. The cushion 19 is supported upon the usual frame including a forward frame member 20 which is hinged to the floor in a manner similar to that described in my co-pending application, but in a specifically different manner as I will now explain.

A removable floor board 21, when removed, provides a space just forwardly of the forward frame member 20 to receive the frame member 20 when it is hinged downwardly and the frame member 20 is hinged at its lower, outer corner, as at 22, so that when hinged downwardly it will lie entirely within the space left by the removal of the board 21.

The hinged portion of the frame member 20 is of the same width as the floor board 21 and at its ends is joined by the narrow sections 20ª, which are fixed to the sides of the vehicle. The frame member 20, in its upright position, rests against angle irons 23 and is maintained in this position by hooks 24.

Upon removal of the cushion 19 and replacement above the raised back 17, then lowering the frame member 20, the space within the vehicle is cleared for the extension of the bed. The back 17 is secured in its upper position as shown in dotted lines, by a chain 25 linked on hook 26 as in my co-pending application.

The rear wall 13 of the cab merges into the turtle back 14 so as to leave a continuous space behind the seat 18 and within the turtle back.

I will now describe the bed.

The bed is of construction similar to that described in my co-pending application, comprising a series of side members and end members hinged together, and a web or netting of steel wires secured to the side members and end members through the medium of coil springs.

The present bed includes three sections, A, B, and C, the intermediate section B being joined to the forward section C by frictional rivet hinges 27 as in the bed of the co-pending application and to the rear section A by means of a double joint, allowing the sections A and B to be collapsed side by side. When in folded position the sections A and B occupy the space behind the back 27 with the double joint hinge at the top and somewhat spread apart as shown, so that the weight of the sections A and B will cause them to spread when they are released from their suspending means which I will hereinafter describe.

The particular construction of the double joints, includes a pair of plates 28 pivoted to the ends of the respective sections A and B by frictional hinge rivets 29. Referring now to Fig. 4, the ends of the sections A and B extend beyond the hinge rivets to such a distance that when the sections are brought to aligned positions as indicated in dotted lines in that section, the ends will abut each other. For this purpose the inner corner, in order to meet and pass each other, are cut away upon curves as at 30, the remainder of the ends being squared to prevent movement of the sections beyond aligned position.

Secured rearwardly to or formed integrally with the plate 28 is a supporting yoke member, including the arms 31, connected by the cross member 32, the latter extending from side to side of the bed in order to prevent collapsing of the side members toward each other under pressure caused by the weight of an occupant. In this the yoke serves the same object described in my former application. The yoke construction differs from that of my former application in that it is rigidly connected to the plates 28.

It will be seen that when the bed is in folded position, the yoke will be received between the sections A and B.

In order to further insure against movement of the sections A and B beyond aligned position, and to rigidly position the supporting yoke perpendicular to the extended side members of the bed, I provide lugs 33 on the inner faces of the arms 31, adapted to receive the ends of the sections A and B as shown in Fig. 4. One of the bed springs 34, of extra heavy construction and carrying an extra heavy wire 35ª to support the bedding in the raised position of the bed may be attached to each lug 33. The webbing of the bed is shown in Fig. 3 at 35.

The sections A and B are automatically guided to and from proper extended position by guide rods 36 secured between the shelf 15 and floor 11 as shown in Fig. 1. A pulley bracket 37 extends outwardly from each plate 28 and supports a pair of rollers 38 which receive between them the guide rod 36. The bracket 37 also serves to receive the ends of a pair of raising chains 39 which extend upwardly over pulleys 40, thence forwardly around pulleys 41 and which are connected at 42 (Fig. 2) and thence extend forwardly in a single chain 43. The chain 43 and chains 39 are normally contained within the space behind the back 17. The chains 39 are of such a length that when the bed is in its extended position, they may extend from the bed up over the pulleys 40 and 41 and thence to the point 42 as indicated in Fig. 2. In raising the bed, the chain 43 is placed around an open pulley 44 secured under the instrument board or dash 45, and the direction of pull of the chain may thus be changed so that the chain may be pulled from the outside and the pull upon both chains 39 be equalized. To this end the pulley 44 is centered between the ends of the instrument board or dash 45.

When the bed has been raised to its folded position a pair of hooks 46, secured to the shelf 15, are hooked around the brackets 37 to securely retain the bed in its raised position.

When the bed is in extended position, a chain 43 may be hooked to the hook 26 so as not to interfere with occupancy of the bed.

I provide means for guiding the bed to its extended position, including the guide rods 36 and the guide rails 47. As the double joints of the bed slide downwardly, the inclined straight portion 48, of the guide rods 36, guides them downwardly to clear the shoulder formed between the turtle back 14 and the back wall 13. The section A is of such a length as to substantially clear the floor and it may be dropped downwardly in a vertical direction for some distance before it begins to spread materially. After the section A has cleared the shoulder of the turtle back, its lower end, which is provided with a pair of flanged rollers 49, spaced to receive the flanges of the rails 47, follows the rail toward the rear end of the vehicle. At the same time, the inclined portion 50 of the guide rod 36 moves the entire bed rearwardly in the vehicle until the end of the section A has received its proper position near the rear extremity of the turtle back. The rails 47 are provided with upturned ends 51 against which the pulleys 49 rest when the section A is in its rested position. The ends 51 serve to guide the pulleys onto the rails proper.

The section B assumes a raised position inclined somewhat away from the perpendicular shown in Fig. 1 and the section C is provided with casters 52 adapted to roll upon the floor of the vehicle so that immediately the weight of the sections A and B is freed from the hooks 46, the sections B and C will move forward under this weight toward their proper extended position. It will now be seen that with the frame member 20 flush with the floor the casters 52 may move forwardly without any obstruction to their progress. The rollers 52 are of flange construction similar to the rollers 49 and travel upon rails 53 which are extended into depressions 54ª in the frame member 20 so as to bridge the gap formed between the frame member 20 and the rear extremity of the opening left by the floor board 21 when the frame member 20 is in its lower position.

Since the rear casters 52 remain at all times upon the rails, it will be seen that as the chain 43 is pulled upon, the sections will be guided automatically back to their folded positions.

The bedding is folded together with the bed and is indicated at 54ᵇ in Fig. 1. It will be seen that the rod 36 will lock the bed against longitudinal movement in its extended position. I provide a hinged supporting yoke 54 for supporting the sections B and C near their joined ends. A slot 55 in the floor 11 receives the end of the yoke 54 to prevent movement of the yoke relative to the floor. Since the bed is held against longitudinal movement, it will be seen that there is thus no possibility of its collapsing due to the hinged nature of the yoke 54. The yoke 54 is similar in construction to the yoke 31 except in its method of connection to the bed. To support the outer ends of the bed, I provide a series of hinged legs 57 which may be folded alongside the side members of the bed. The legs 57 are maintained in their extended position merely by the frictional engagement of their hinged connections.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A bed for a vehicle having a turtle back body construction, a seat including a back and cushion forming, together with the turtle back, a continuous space behind and under the seat; comprising three sections hinged together so as to fold within the space immediately behind and under the seat, the rear and intermediate sections in substantially vertical position with their hinge at the top, and the forward section extending forwardly under the cushion, the rear and intermediate sections being adapted to spread apart, their hinge moving toward the floor, and to thereby move the forward section forwardly, in order to bring the bed to a position extended upon the vehicle floor and guide rods with which the rear and intermediate sections are connected near their common hinge, adapted to guide the bed to its proper position longitudinally of the vehicle.

2. A bed for a vehicle having a turtle back body construction, a seat including a back and cushion forming, together with the turtle back, a continuous space behind and under the seat; comprising three sections hinged together so as to fold within the space immediately behind and under the seat, the rear and intermediate sections in substantially vertical position with their hinge at the top, and the forward section extending forwardly under the cushion, the rear and intermediate sections being adapted to spread apart, their hinge moving toward the floor, and to thereby move the forward section forwardly, in order to bring the bed to a position extended upon the vehicle floor, a yoke shaped supporting member secured to the rear and intermediate sections hinge, positioned at right angles to the bed when the latter is in extended position, means to retain the bed against longitudinal movement when in longitudinal position, and a supporting yoke hinged to the bed near the intermediate and forward sections hinge.

3. A bed for a vehicle having a turtle back body construction, a seat including a back and cushion forming, together with the turtle back, a continuous space behind and under the seat; comprising three sections hinged together so as to fold within the space immediately behind and under the seat, the rear and intermediate sections in substantially vertical position with their hinge at the top, and the forward section extending forwardly under the cushion, the rear and intermediate sections being adapted to spread apart, their hinge moving toward the floor, and to thereby move the forward section forwardly, in order to bring the bed to a position extended upon the vehicle floor, a yoke shaped supporting member secured to the rear and intermediate sections hinge, positioned at right angles to the bed when the latter is in extended position, means to retain the bed against longitudinal movement when in longitudinal position, and a supporting yoke hinged to the bed near the intermediate and forward sections hinge, the floor having a depression to receive said hinged supporting yoke in upright position.

4. A bed for a vehicle of the class described, comprising a rear and intermediate section hinged together to rest normally adjacent each other in an upstanding position, their hinged ends received in a restricted space of said vehicle, a forward section hinged to the intermediate section and normally projecting in a horizontal position, the forward section being movable horizontally upon the floor and the rear section being spaced from the floor when in its upright position to allow it to drop vertically while the intermediate section moves forward and vertically, in order to clear a confining wall of said restricted space.

5. A bed for a vehicle of the class described, comprising a rear and intermediate section hinged together to rest normally adjacent each other in an upstanding position, a forward section hinged to the intermediate section and normally projecting in a substantially horizontal position, the rear and intermediate sections being adapted to spread apart, their hinge moving toward the floor, and the rear section being normally spaced from the floor and provided with rollers at its extremity, and tracks secured to the floor, said tracks having upturned ends receiving said rollers when the rear section is in its vertical position and adapted to guide the rollers upon the horizontal portions of the track as the rear section moves downward.

6. A bed for a vehicle of the class described, including bed sections hinged together and normally resting adjacent each other in an upstanding position with their hinged ends uppermost, and guide rods with which said sections are connected near their hinge, adapted to guide the bed to its proper position longitudinally of the vehicle as the sections spread apart, said guide rods being inclined during a major portion of their length and having perpendicular portions at their lower extremities.

7. A bed for a vehicle of the class described, including sections hinged together and adapted to rest normally adjacent each other in an upstanding position and thence to spread apart and move downwardly to a horizontal position, a common hinge connecting said sections, said hinge including a yoke shaped supporting leg and integral roller brackets, rollers supported by said brackets, and guide rods engaged by said rollers for guiding the sections to their proper horizontal positions.

8. A bed for a vehicle of the class described, comprising bed sections hinged together and adapted to rest normally adjacent each other in an upstanding position, their hinge at the top and thence to spread apart and move downwardly to horizontal positions, a raising chain secured to said sections near their hinge and extending upwardly, pulleys supported from the vehicle above the bed over which said chains extend, said chains being brought together and having a common portion adapted to extend forwardly to the dash of the vehicle, and a pulley secured under the instrument board of the vehicle to receive said chain.

Signed this 1st day of September, 1926, at Sioux City, in the county of Woodbury and State of Iowa.

LESTER E. IKE.